(12) United States Patent
Wang et al.

(10) Patent No.: US 12,525,644 B2
(45) Date of Patent: Jan. 13, 2026

(54) CO-DOPED LITHIUM ALUMINUM TITANIUM PHOSPHATE SOLID ELECTROLYTE MATERIAL FOR LITHIUM ION BATTERY AND METHOD FOR PREPARING THE SAME

(71) Applicant: National Taipei University of Technology, Taipei (TW)

(72) Inventors: Sea-Fue Wang, Taipei (TW); Yi-An Ko, Taipei (TW); Ting-Kai Shieh, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 705 days.

(21) Appl. No.: 17/964,635

(22) Filed: Oct. 12, 2022

(65) Prior Publication Data
US 2024/0006655 A1    Jan. 4, 2024

(30) Foreign Application Priority Data
Jun. 29, 2022   (TW) .................................. 111124224

(51) Int. Cl.
*H01M 10/0562* (2010.01)
*C01B 25/45* (2006.01)
*H01M 10/0525* (2010.01)

(52) U.S. Cl.
CPC ......... *H01M 10/0562* (2013.01); *C01B 25/45* (2013.01); *H01M 10/0525* (2013.01); *C01P 2002/52* (2013.01); *C01P 2006/40* (2013.01); *H01M 2300/0068* (2013.01)

(58) Field of Classification Search
CPC ......... H01M 10/0562; H01M 10/0525; H01M 2300/0068; C01B 25/45; C01P 2002/52
See application file for complete search history.

(56) References Cited

FOREIGN PATENT DOCUMENTS

WO    2018/181673 A1 * 10/2018

OTHER PUBLICATIONS

"B2O3-Doped LATP Glass-Ceramics Studied by X-ray Diffractometry and MAS NMR Spectroscopy Methods", Slubowska, et al., Nanomaterials, 2021, 11, 390 (Year: 2021).*

"Enhanced ionic conductivity and electrochemical stability of Indium doping Li1.3Al0.3Ti1.7(PO4)3 solid electrolytes for all-solid-state lithium-ion batteries", Li, et al., Ionics, 2022, 28, 63-72 (Li). (published online 2021).*

* cited by examiner

*Primary Examiner* — Aiqun Li
(74) *Attorney, Agent, or Firm* — HSML P.C.

(57) ABSTRACT

Disclosed herein is a co-doped lithium aluminum titanium phosphate solid electrolyte material for a lithium ion battery, which is represented by formula (I): $Li_{1+z}Al_{z-y-x}B_yIn_xTi_{2-z}(PO_4)_3$. Also, disclosed herein is a method for preparing a co-doped lithium aluminum titanium phosphate solid electrolyte material, which includes subjecting a first mixture to a grinding treatment, followed by calcination, so as to obtain a powder of a co-doped lithium aluminum titanium phosphate of formula (I); mixing the powder of the co-doped lithium aluminum titanium phosphate with a binder, followed by granulation, so as to obtain a second mixture; subjecting the second mixture to compression molding, so as to obtain a green compact; and subjecting the green compact to a sintering treatment, so as to obtain the co-doped lithium aluminum titanium phosphate solid electrolyte material.

10 Claims, No Drawings

CO-DOPED LITHIUM ALUMINUM TITANIUM PHOSPHATE SOLID ELECTROLYTE MATERIAL FOR LITHIUM ION BATTERY AND METHOD FOR PREPARING THE SAME

CROSS-REFERENCE TO RELATED APPLICATION

This application claims priority of Taiwanese Invention Patent Application No. 111124224, filed on Jun. 29, 2022.

FIELD

The disclosure relates to a solid electrolyte material, and more particularly to a co-doped lithium aluminum titanium phosphate solid electrolyte material for a lithium ion battery. The present disclosure also relates to a method for preparing the co-doped lithium aluminum titanium phosphate solid electrolyte material.

BACKGROUND

Sodium (Na) super ionic conductor (NaSICON)-type lithium aluminum titanium phosphate (LATP) has high conductivity, good thermal and mechanical stability at room temperature, and can be manufactured with low cost, and hence is suitable for use as a solid electrolyte for an all-solid-state lithium-ion battery.

However, the conductivity of the NaSICON-type LATP solid electrolyte is lower than those of lithium super ionic conductor (LiSICON)-type solid electrolyte and argyrodite-type solid electrolyte. In general, the conductivity of NaSICON-type LATP solid electrolyte can only reach up to $10^{-4}$ S/cm, and an extremely high melting temperature is required to prepare the NaSICON-type LATP solid electrolyte having a high conductivity.

SUMMARY

Accordingly, in a first aspect, the present disclosure provides a co-doped lithium aluminum titanium phosphate solid electrolyte material for a lithium ion battery, which can alleviate at least one of the drawbacks of the prior art. The co-doped lithium aluminum titanium phosphate solid electrolyte material is represented by formula (I):

$$Li_{1+z}Al_{z-y-x}B_yIn_xTi_{2-z}(PO_4)_3 \qquad (I)$$

wherein:
x ranges from 0.001 to 0.015;
y ranges from 0.06 to 0.10; and
z ranges from 0.3 to 0.5.

In a second aspect, the present disclosure provides a method for preparing a co-doped lithium aluminum titanium phosphate solid electrolyte material, which can alleviate at least one of the drawbacks of the prior art. The method includes:
(a) subjecting a first mixture to a grinding treatment, followed by calcination, so as to obtain a powder of a co-doped lithium aluminum titanium phosphate represented by formula (I), $$Li_{1+z}Al_{z-y-x}B_yIn_xTi_{2-z}(PO_4)_3 \qquad (I)$$

wherein:
x ranges from 0.001 to 0.015,
y ranges from 0.06 to 0.10, and
z ranges from 0.3 to 0.5, the first mixture including a lithium salt, aluminum oxide, a titanium-containing oxide, a phosphorus-containing inorganic compound, an indium-containing inorganic compound, and a boron-containing inorganic compound;
(b) mixing the powder of the co-doped lithium aluminum titanium phosphate with a binder, followed by granulation, so as to obtain a second mixture; (c) subjecting the second mixture to compression molding, so as to obtain a green compact; and
(d) subjecting the green compact to a sintering treatment, so as to obtain the co-doped lithium aluminum titanium phosphate solid electrolyte material.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word 'comprising' means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a co-doped lithium aluminum titanium phosphate solid electrolyte material for a lithium ion battery. The co-doped lithium aluminum titanium phosphate solid electrolyte material is represented by formula (I):

$$Li_{1+z}Al_{z-y-x}B_yIn_xTi_{2-z}(PO_4)_3 \qquad (I)$$

wherein:
x ranges from 0.001 to 0.015;
y ranges from 0.06 to 0.10; and
z ranges from 0.3 to 0.5.

In certain embodiments, x ranges from 0.005 to 0.013.
In certain embodiments, y ranges from 0.07 to 0.09.
In certain embodiments, z ranges from 0.3 to 0.4.

According to the present disclosure, the co-doped lithium aluminum titanium phosphate solid electrolyte material has high conductivity, and hence is suitable for use as a solid electrolyte for an all-solid-state lithium-ion battery.

The present disclosure also provides a method for preparing a co-doped lithium aluminum titanium phosphate solid electrolyte material. The method includes:
(a) subjecting a first mixture to a grinding treatment, followed by calcination, so as to obtain a powder of a co-doped lithium aluminum titanium phosphate represented by formula (I), $$Li_{1+z}Al_{z-y-x}B_yIn_xTi_{2-z}(PO_4)_3 \qquad (I)$$

wherein:
x ranges from 0.001 to 0.015,
y ranges from 0.06 to 0.10, and
z ranges from 0.3 to 0.5,
the first mixture including a lithium salt, aluminum oxide, a titanium-containing oxide, a phosphorus-containing inorganic compound, an indium-containing inorganic compound, and a boron-containing inorganic compound;

(b) mixing the powder of the co-doped lithium aluminum titanium phosphate with a binder, followed by granulation, so as to obtain a second mixture;

(c) subjecting the second mixture to compression molding, so as to obtain a green compact; and (d) subjecting the green compact to a sintering treatment, so as to obtain the co-doped lithium aluminum titanium phosphate solid electrolyte material.

In certain embodiments, the lithium salt is selected from the group consisting of lithium carbonate ($Li_2CO_3$), lithium hydroxide (LiOH), and lithium nitrate ($LiNO_3$).

In certain embodiments, the titanium-containing oxide is selected from the group consisting of titanium dioxide ($TiO_2$) and iron titanium oxide ($FeTiO_3$).

In certain embodiments, the phosphorus-containing inorganic compound is selected from the group consisting of phosphoric acid ($H_3PO_4$), ammonium dihydrogen phosphate ($NH_4H_2PO_4$), sodium dihydrogen phosphate ($NaH_2PO_4$), and potassium dihydrogen phosphate ($KH_2PO_4$).

In certain embodiments, the indium-containing inorganic compound is selected from the group consisting of indium (III) oxide ($In_2O_3$) and indium (III) hydroxide ($In(OH)_3$).

In certain embodiments, the boron-containing inorganic compound is selected from the group consisting of boric acid ($H_3BO_3$) and boron oxide ($B_2O_3$).

In certain embodiments, the binder is selected from the group consisting of polyvinyl alcohol (PVA), paraffin, polyethylene (PE), polypropylene (PP), polystyrene (PS), poly (methyl methacrylate) (PMMA), an ethylene-vinyl acetate (EVA) copolymer, and an ethylene-ethyl acrylate (EEA) copolymer.

In certain embodiments, in step (a), the calcination is conducted at a temperature ranging from 600° C. to 800° C.

In certain embodiments, in step (d), the sintering treatment is conducted at a temperature ranging from 800° C. to 1000° C.

The disclosure will be further described by way of the following example and comparative examples. However, it should be understood that the following examples are solely intended for the purpose of illustration and should not be construed as limiting the disclosure in practice.

EXAMPLES

<Preparation of Solid Electrolyte Materials>

Example (EX): $Li_{1.3}Al_{0.21}B_{0.08}In_{0.01}Ti(PO_4)_3$

Powders of lithium carbonate ($Li_2CO_3$), aluminum oxide ($Al_2O_3$), boric acid ($H_3BO_3$), indium oxide ($In_2O_3$), titanium dioxide ($TiO_2$), and ammonium dihydrogen phosphate ($NH_4H_2PO_4$) (all with a purity greater than 99.9%) were mixed in a molar ratio of $$\frac{1.3}{2} : \frac{0.21}{2} : 0.08 : \frac{0.01}{2} : 1.7 : 3,$$

so as to obtain a first mixture. The first mixture was then added into a ball mill that included a plurality of zirconia grinding balls having a diameter of 10 mm (the weight ratio of the first mixture to the zirconia grinding balls was 1:20). Next, isopropyl alcohol was added to the ball mill, followed by conducting a ball milling treatment for 12 hours, so as to obtain a slurry. The slurry was subjected to a drying treatment in an oven at 90° C. for 24 hours, so as to obtain a dried powder of the slurry.

Thereafter, the dried powder of the slurry was ground in a mortar, and then the resultant ground product was placed on a platinum sheet in an alumina crucible. The ground product was heated to 700° C. at a rate of 5° C./min in a high temperature furnace, and then the temperature of the ground product was maintained at 700° C. for 4 hours for calcination, so as to obtain a powder of $Li_{1.3}Al_{0.21}B_{0.08}In_{0.01}Ti_{1.7}(PO_4)_3$.

After that, the powder of $Li_{1.3}Al_{0.21}B_{0.08}In_{0.01}Ti_{1.7}(PO_4)_3$ was ground in a mortar, and the resultant ground product was added into a ball mill that included a plurality of zirconia grinding balls having a diameter of 10 mm (the weight ratio of the powder of $Li_{1.3}Al_{0.21}B_{0.08}In_{0.01}Ti_{1.7}(PO_4)_3$ to the zirconia grinding balls was 1:20). Next, isopropyl alcohol was added to the ball mill, followed by conducting a ball milling treatment for 12 hours, so as to avoid agglomeration and to obtain a slurry. The slurry was subjected to a drying treatment in an oven at 90° C. for 24 hours, so as to obtain a powder of a co-doped lithium aluminum titanium phosphate.

The powder of the co-doped lithium aluminum titanium phosphate and an aqueous solution (15%, v/v) of polyvinyl alcohol (PVA) (serving as a binder) were mixed in a weight ratio of 5.2:94.8, followed by granulation, so as to obtain a second mixture.

The second mixture was filtered using a sieve (mesh size 200), and 15 g of the resultant particles with a desired particle size were placed into a round dish mold, followed by compression molding using a uniaxial cold press at a pressure of 150 MPa for 30 seconds, so as to obtain a green compact having a diameter of about 9 mm and a thickness of about 1 mm.

Thereafter, the green compact was placed on an alumina crucible. The green compact was heated to 550° C. at a rate of 5° C./min in a high temperature furnace, and then the temperature of the green compact was maintained at 550° C. for 4 hours, so as to remove the binder. After cooling to room temperature, the green compact was heated to 900° C. at a rate of 5° C./min in a high temperature furnace, and then the temperature of the ground product was maintained at 900° C. for 4 hours for sintering, so as to obtain a solid electrolyte material represented by the formula of $Li_{1.3}Al_{0.21}B_{0.08}In_{0.1}Ti_{1.7}(PO_4)_3$.

Comparative Example 1 (CE1): $Li_{1.3}Al_{0.3}Ti_{1.7}(PO_4)_3$

The procedures for preparing the solid electrolyte material of CE1 were similar to those of EX, except that the molar ratio of $Li_2CO_3$, $Al_2O_3$, $H_3BO_3$, $In_2O_3$, $TiO_2$ and $NH_4H_2PO_4$ was $$\frac{1.3}{2} : \frac{0.3}{2} : 0 : 0 : 1.7 : 3.$$

Comparative Example 2 (CE2): $Li_{1.3}Al_{0.24}B_{0.06}Ti_{1.7}(PO_4)_3$

The procedures for preparing the solid electrolyte material of CE2 were similar to those of EX, except that the molar ratio of $Li_2CO_3$, $Al_2O_3$, $H_3BO_3$, $In_2O_3$, $TiO_2$, and $NH_4H_2PO_4$ was $$\frac{1.3}{2} : \frac{0.24}{2} : 0.06 : 0 : 1.7 : 3.$$

Comparative Example 3 (CE3):
$Li_{1.3}Al_{0.22}B_{0.08}Ti_{1.7}(PO_4)_3$

The procedures for preparing the solid electrolyte material of CE3 were similar to those of EX, except that the molar ratio of $Li_2CO_3$, $Al_2O_3$, $H_3BO_3$, $In_2O_3$, $TiO_2$, and $NH_4H_2PO_4$ was $$\frac{1.3}{2}:\frac{0.22}{2}:0.08:0:1.7:3.$$

Comparative Example 4 (CE4): $Li_{1.3}Al_{0.2}B_{0.1}Ti_{1.7}(PO_4)_3$

The procedures for preparing the solid electrolyte material of CE4 were similar to those of EX, except that the molar ratio of $Li_2CO_3$, $Al_2O_3$, $H_3BO_3$, $In_2O_3$, $TiO_2$, and $NH_4H_2PO_4$ was $$\frac{1.3}{2}:\frac{0.2}{2}:0.10:0:1.7:3.$$

Comparative Example 5 (CE5):
$Li_{1.3}Al_{0.19}B_{0.08}In_{0.03}Ti_{1.7}(PO_4)_3$ The procedures for preparing the solid electrolyte material of CE5 were similar to those of EX, except that the molar ratio of $Li_2CO_3$, $Al_2O_3$, $H_3BO_3$, $In_2O_3$, $TiO_2$, and $NH_4H_2PO_4$ was $$\frac{1.3}{2}:\frac{0.19}{2}:0.08:\frac{0.03}{2}:1.7:3.$$

<Measurement of Conductivity>

The conductivity of the respective one of the solid electrolyte materials of EX and CE1 to CE5 was measured according to procedures known to those skilled in the art. Briefly, two opposite surfaces of the solid electrolyte material were coated with silver paste, and then the two opposite surfaces coated with silver paste (serving as electrodes) were connected to an impedance gain-phase analyzer (Metrohm Autolab PGSTAT204; Serial number: AUT51770), followed by subjecting the solid electrolyte material to determination of resistance (R) value at a frequency ranging from 5 kHz to 1 MHz at room temperature.

The conductivity σ was calculated using the following Equation (1):

$$\sigma = \frac{L}{R \times A} \quad (1)$$

where σ=conductivity
L=thickness of solid electrolyte material
R=resistance value
A=area of a respective one of the two opposite surfaces of solid electrolyte material The results of the measurement of conductivity are shown in Table 1 below. It can be seen from Table 1 that the conductivity determined at room temperature for the solid electrolyte material of EX (i.e., $Li_{1.3}Al_{0.21}B_{0.08}In_{0.01}Ti_{1.7}(PO_4)_3$) was significantly higher than those determined for the solid electrolyte materials of CE1 to CE5. These results indicate that the solid electrolyte material of the present disclosure has excellent lithium ion transport properties, and hence is expected to be useful as a solid electrolyte material for an all-solid-state lithium-ion battery.

TABLE 1

| Solid electrolyte material | Conductivity (σ) (S/cm) |
|---|---|
| EX | $1.08 \times 10^{-3}$ |
| CE1 | $3.92 \times 10^{-4}$ |
| CE2 | $6.63 \times 10^{-4}$ |
| CE3 | $8.33 \times 10^{-4}$ |
| CE4 | $4.70 \times 10^{-4}$ |
| CE5 | $4.30 \times 10^{-4}$ |

Summarizing the above test results, it is clear that by virtue of co-doping of lithium aluminum titanium phosphate with boron and indium, the solid electrolyte material of the present disclosure has high conductivity, and thus is suitable for use as a solid electrolyte for an all-solid-state lithium-ion battery.

All patents and references cited in this specification are incorporated herein in their entirety as reference. Where there is conflict, the descriptions in this case, including the definitions, shall prevail.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A co-doped lithium aluminum titanium phosphate solid electrolyte material for a lithium ion battery, the co-doped lithium aluminum titanium phosphate solid electrolyte material being represented by formula (I):

$$Li_{1+z}Al_{z-y-x}B_yIn_xTi_{2-z}(PO_4)_3 \quad (I)$$

wherein:
x ranges from 0.001 to 0.015;
y ranges from 0.06 to 0.10; and
z ranges from 0.3 to 0.5.

2. The co-doped lithium aluminum titanium phosphate solid electrolyte material according to claim 1, wherein x ranges from 0.005 to 0.013.

3. The co-doped lithium aluminum titanium phosphate solid electrolyte material according to claim 1, wherein y ranges from 0.07 to 0.09.

4. The co-doped lithium aluminum titanium phosphate solid electrolyte material according to claim 1, wherein z ranges from 0.3 to 0.4.

5. A method for preparing a co-doped lithium aluminum titanium phosphate solid electrolyte material according to claim 1, comprising:
(a) subjecting a first mixture to a grinding treatment, followed by calcination, so as to obtain a powder of a co-doped lithium aluminum titanium phosphate represented by formula (I), $$Li_{1+z}Al_{z-y-x}B_yIn_xTi_{2-z}(PO_4)_3 \quad (I)$$

wherein:
x ranges from 0.001 to 0.015,
y ranges from 0.06 to 0.10, and
z ranges from 0.3 to 0.5, the first mixture including a lithium salt, aluminum oxide, a titanium-containing oxide, a phosphorus-containing inorganic compound, an indium-containing inorganic compound, and a boron-containing inorganic compound;
(b) mixing the powder of the co-doped lithium aluminum titanium phosphate with a binder, followed by granulation, so as to obtain a second mixture;
(c) subjecting the second mixture to compression molding, so as to obtain a green compact; and
(d) subjecting the green compact to a sintering treatment, so as to obtain the co-doped lithium aluminum titanium phosphate solid electrolyte material.

6. The method according to claim 5, wherein the indium-containing inorganic compound is selected from the group consisting of indium (III) oxide and indium (III) hydroxide.

7. The method according to claim 5, wherein the boron-containing inorganic compound is selected from the group consisting of boric acid and boron oxide.

8. The method according to claim 5, wherein the binder is selected from the group consisting of polyvinyl alcohol, paraffin, polyethylene, polypropylene, polystyrene, poly(methyl methacrylate), an ethylene-vinyl acetate copolymer, and an ethylene-ethyl acrylate copolymer.

9. The method according to claim 5, wherein in step (a), the calcination is conducted at a temperature ranging from 600° C. to 800° C.

10. The method according to claim 5, wherein in step (d), the sintering treatment is conducted at a temperature ranging from 800° C. to 1000° C.

\* \* \* \* \*